United States Patent [19]
Gabas

[11] Patent Number: 5,553,688
[45] Date of Patent: Sep. 10, 1996

[54] CUTOFF VALVE FOR PISTONS OF HYDRAULIC SELF-ADJUSTING DEVICES

[76] Inventor: Carlos Gabas, 180, calle Rocafort, 08029 Barcelona, Spain

[21] Appl. No.: 374,668

[22] PCT Filed: Apr. 12, 1994

[86] PCT No.: PCT/ES94/00037

§ 371 Date: Jan. 20, 1995

§ 102(e) Date: Jan. 20, 1995

[87] PCT Pub. No.: WO95/01514

PCT Pub. Date: Jan. 12, 1995

[30]     Foreign Application Priority Data

Jun. 30, 1993 [ES] Spain .................... 9301467

[51] Int. Cl.⁶ .................... F16C 1/22; F16D 13/75
[52] U.S. Cl. .................... 188/196 A; 192/109 F; 192/111 A
[58] Field of Search .................... 188/351, 196 A, 188/71.8, 196 P, 196 C, 282, 317, 322.15, 322.22, 316, 313; 192/111 A, 109 F; 267/221, 226

[56]         References Cited

U.S. PATENT DOCUMENTS 2,593,192  4/1952  Rockwell ............................ 192/111 A
4,735,298  4/1988  Hauguel ............................. 188/196 A
5,211,379  5/1993  Porter ............................... 267/221
5,265,710  11/1993 Gabas et al. ........................ 188/282

FOREIGN PATENT DOCUMENTS 9002014  7/1990  Spain .

*Primary Examiner*—Douglas C. Butler

[57]         ABSTRACT

A cutoff valve for pistons of hydraulic self-adjusting devices, comprising an essentially cylindrical through element (18), attached axially to the internal end of the rod (3) of the device (1), and a cutoff element (19), also essentially cylindrical, arranged coaxially with the rod (3) on which it slides with a tight fit. The through element (18) has through holes (23) through which the liquid fluid (F) contained within the main body (2) of the device (1) can flow. The cutoff element (19) has a cutoff joint (29), which can block the holes (23) of the through element (18), and a peripheral thickening (30) provided with a sealing joint or ring (33) and a number of channels (31) through which the liquid fluid (F) can flow freely. The cutoff valve can be used in the car industry.

12 Claims, 1 Drawing Sheet

CUTOFF VALVE FOR PISTONS OF HYDRAULIC SELF-ADJUSTING DEVICES

BACKGROUND OF THE INVENTION

The present invention relates to a cutoff valve for pistons of hydraulic self-adjusting devices, in particular for use in hydraulic-self-adjusting devices designed for the permanent, automatic adjustment of the length of control cables.

Hydraulic self-adjusting devices for the permanent, automatic adjustment of the length of control cables are widely known and generally consist of steel cables provided with a protective sheath and attached to an actuating mechanism, such as a pedal for example, with an associated mechanism, such as the clutch of a car for example. These self-adjusting devices carry out adjustment independently of the initial adjustment of the length of the control cable, which is normally carried out when the cable is fitted by means of devices designed for the purpose that operate only during said initial adjustment process.

The Spanish patent P 9002014 describes a hydraulic self-adjusting device which consists basically of a cylindrical main body, joined to the mechanism to be actuated, and an adjustment rod, one of the ends of which, the external end, is attached the control cable, whilst the other end, the internal end, has a piston provided with a cutoff valve, said piston defining two semi-chambers inside the main body between which the hydraulic fluid can flow. Furthermore, said device comprises an adjustment spring and volumetric compensation means. This devices operates in such a way that the required increase in length of the control cable as a result of the mechanical demands placed on the mechanism it actuates (for example the progressive wear of the facing on the clutch plate of a car) is provided by the increase in length of the portion of the adjustment rod which protrudes from the main body of the self-adjusting device.

One of the cutoff valves for such hydraulic self-adjusting devices which is described by said patent P 9002014 comprises a through element, a cutoff element and an opening spring which works in compression, these elements being arranged coaxially with the adjustment rod. The purpose of the opening spring is to maintain the cutoff valve open so that the liquid fluid can flow between the two semi-chambers of the main body when the adjustment rod is not being pulled by the control cable. The cutoff valve establishes the hydraulic communication between the two semi-chambers by means of the close fit between the cutoff element of the valve and the inner wall of the main body.

This cutoff valve described by the Spanish patent P 9002014 suffers from the drawback that it consists of a large number of components, which increases the cost of production of the valve as well as its assembly.

SUMMARY OF THE INVENTION

Accordingly, it is an object of the present invention to provide a new type of cutoff valve which avoids the disadvantages of the prior art, in particular a relatively large number of components of the known types of cutoff valves.

It is another object of the present invention to provide a cutoff valve which has a new structure and high operational reliability.

The cutoff valve according to the invention constitutes the body of the piston of a hydraulic self-adjusting device such as those described above, i.e. a hydraulic self-adjusting device which comprises the following known elements: a main body which is cylindrical, elongated and hollow and which contains a liquid fluid; an adjustment rod, one of the ends of which, the internal end, is fitted with said piston whilst the other end, the external end, protrudes from the main body by a variable amount and is attached to the corresponding end of the control cable; an adjustment spring arranged inside the main body coaxially with the rod, said spring working constantly in compression, one of its ends resting against the end of the main body from which the rod protrudes, its other end resting against the internal end of the rod by means of a transverse support shoulder joined to said rod, such that the spring tends to constantly push the rod towards the interior of the main body.

The cutoff valve according to the invention consists of a through element and a cutoff element. The through element is attached to the internal end of the adjustment rod such that is forms an integral part thereof. The cutoff element is arranged coaxially with the adjustment rod such that it can slide along it over a length determined by the distance between the through element and the transverse support shoulder of the rod.

The through element has an essentially cylindrical shape and is provided with a plurality of longitudinal through holes through which the liquid fluid contained within the main body can flow. The through element is also provided with a peripheral groove which is coaxial with the adjustment rod, the size of said groove being such that is fitted with a selaing ring which, by elastic reaction, presses constantly against the inner surface of the wall of the main body, thereby preventing the liquid fluid from passing via the close fit between said wall and said sealing joint.

The cutoff element of the valve which forms the object of the present invention is essentially cylindrical in shape and has a central through hole through which the adjustment rod passes with a tight fit, the end of the cutoff element which faces the through element having a coaxial front groove in which is fitted a cutoff joint, the size of said cutoff joint being such that when the valve is in the closed position it blocks the through holes of the through element, preventing the liquid fluid from flowing.

The cutoff valve which forms the object of the present invention is characterized in that the cutoff element has a peripheral thickening in which are arranged several longitudinal channels through which the liquid fluid contained within the main body can flow freely, said thickening having a coaxial groove that contains a sealing joint or ring which, by elastic reaction, presses constantly against the inner surface of the wall of the main body.

BRIEF DESCRIPTION OF THE DRAWINGS

The accompanying drawings illustrate the cutoff valve for pistons of hydraulic self-adjusting devices which forms the object of the present invention.

In said drawings.

DESCRIPTION OF A PREFERRED EMBODIMENT

Figure 1:
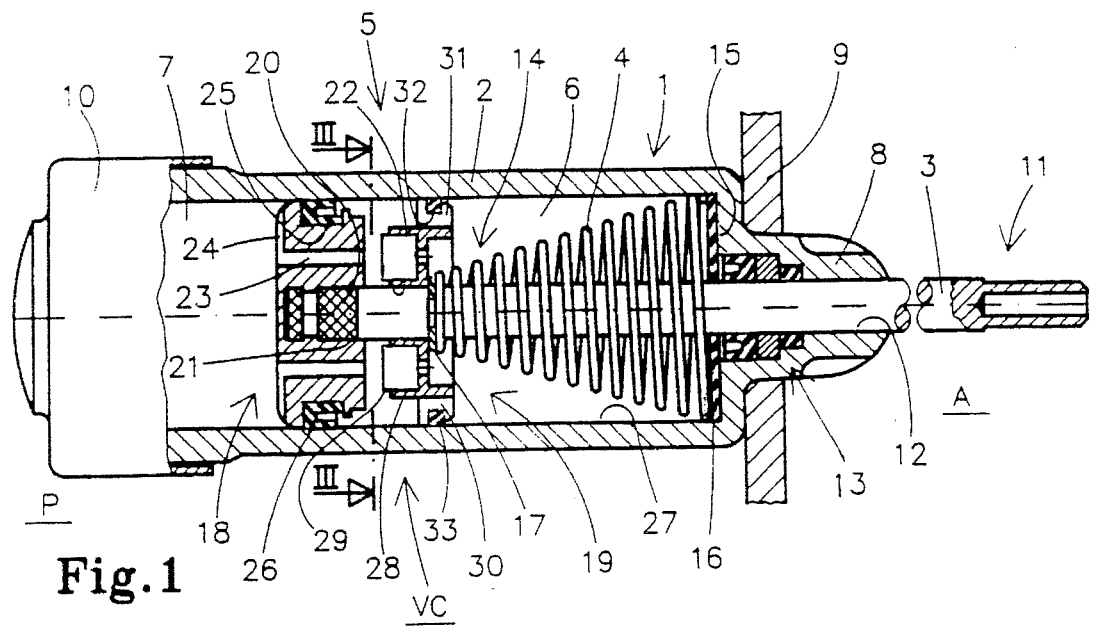
FIGS. 1 and 2 are partial section views showing the valve according to the invention fitted in a hydraulic self-adjusting device with the valve in the open and closed positions respectively.
Figure 2:
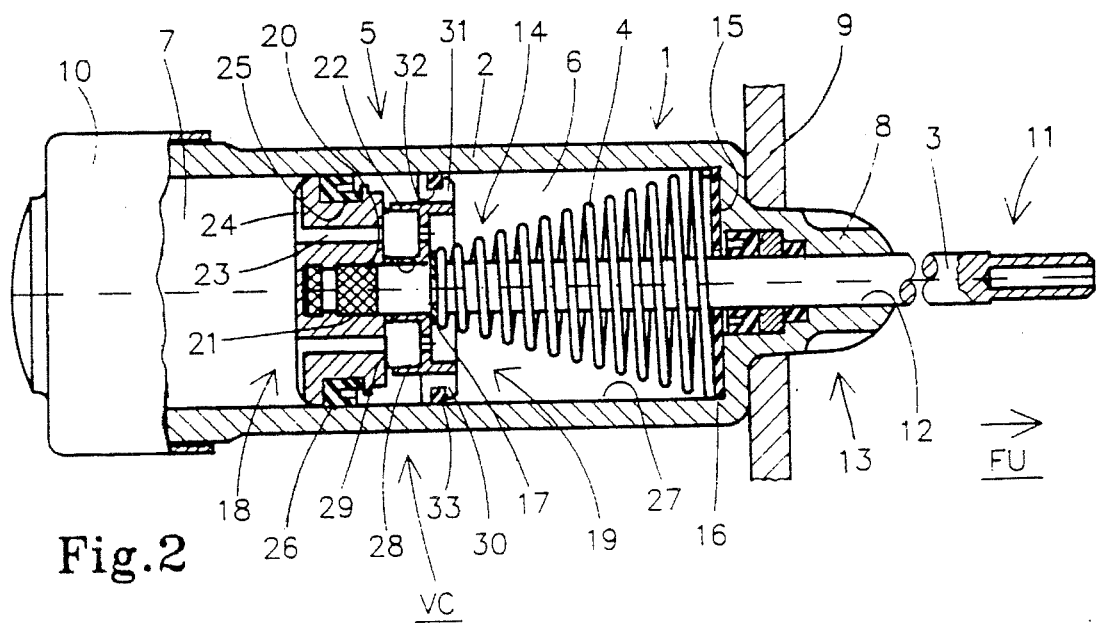
Figure 3:
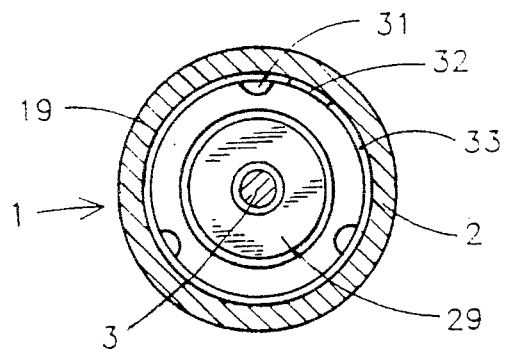
FIG. 3 is a cross sectional view taken across the line III—III of FIG. 1.

The cutoff valve VC for pistons of hydraulic self-adjusting devices that forms the object of the present invention, and which is described herein by way of example of a preferred embodiment, is attached to the self-adjusting device 1 shown in FIGS. 1 and 2, said device 1 being designed the carry out the constant, automatic adjustment of the length of a control cable which, for greater clarity, is not shown in the drawings. As has been said, it is understood that said control cable forms part of any mechanism in which its operation requires the constant adjustment of the length of said cable, as for example in the case of the control cable attached to the pedal which operates the clutch of a car. The self-adjusting device 1 shown in the drawings therefore constitutes only an illustrative example and may adopt any other configuration which is suitable for a particular application without affecting the basic concept of the invention.

The self-adjusting device 1 comprises a main body 2 which contains the liquid fluid F, an adjustment rod 3, an adjustment spring 4 and a piston 5, said piston 5 defining two semi-chambers 6 and 7, front and rear respectively, inside the main body 2.

The diagrams show that the main body 2 has an elongated, hollow, essentially cylindrical shape, at the front end A of which is an axial extension 8 that enables the device 1 to be attached to a fixed point 9, and at the rear end of which is a closing cover 10 that may comprise volumetric compensating means which, for the same reasons as described above, are not shown in the drawings.

FIGS. 1 and 2 show that the front or external end 11 of the adjustment rod 3 protrudes from the main body 2 via a through hole 12 such that it can slide with a tight fit, said hole 12 being provided with sealing means 13 to prevent the leakage or escape of the liquid F to the outside. The piston 5 is arranged at the rear or internal end 14 of the rod 3, said piston comprising the cutoff valve VC which forms the object of the present invention.

FIGS. 1 and 2 show that the adjustment spring 4 is helicoidal, has an essentially trunco-conical shape and is arranged coaxially with the adjustment rod. The spring 4 works constantly in compression, its wider diameter resting against a step 15, via a washer 16, which defines the hole 12 in the front end A of the main body, the smaller diameter of the spring 4 resting against the transverse support shoulder 17 fixed to the interior end 14 of the adjustment rod 3. In this way, the elastic reaction of the adjustment spring 4 tends to constantly force the protruding portion of the adjustment rod 3 towards the interior of the main body 2.

The above description of the self-adjusting device is known and is commonly used in self-adjusting devices designed to carry out the constant, automatic adjustment of the length of control cables.

The diagrams show that the cutoff valve VC that forms the object of the invention comprises a through element 18 and a cutoff element 19, both produced preferably by the injection of a light alloy material such as the zamak alloys.

The through element 18 has an essentially cylindrical shape and is formed by injection onto the knurling provided for the purpose on the internal end 14 of the adjustment rod 3. In this way, the knurling 20 is therefore inside the cavity 21 of the through element 18 such that said through element 18 forms an integral part of the adjustment rod 3. With this arrangement, during the operation of the device 1, the through element 18 is prevented from changing its position relative to the adjustment rod 3, i.e. the through element 18 is prevented from rotating about the adjustment rod 3.

The cutoff element 19 also has an essentially cylindrical shape and is arranged coaxially with the adjustment rod 3 by means of the axial hole 22, the size of said hole 22 being such that the cutoff element 19 can slide with a tight fit on said rod 3 over the portion that lies between the through element 18 and the transverse support shoulder 17.

FIGS. 1 and 2 show that the through element 18 is provided with through holes 23 through which the liquid fluid F can flow, the rear opening of said holes 23 having a channel 24 designed to increase the passage cross section of the fluid F in said portion of the hole 23. The through element 18 is provided with a peripheral groove 25 in which is fitted a sealing joint 26 which, by elastic reaction, prevents the liquid fluid F from passing via the close fit between said sealing joint 26 and the inner surface 27 of the main body 2.

The end of the cutoff element 19 which faces the through element 18 has a front groove 28 which is coaxial with the adjustment rod 3 and which defines a housing in which a sealing joint 29 is firmly fitted. Laterally, the cutoff element has a peripheral thickening 30 provided with three longitudinal channels 31, arranged at regular intervals, through which the liquid fluid F can flow freely. The peripheral thickening 30 has a coaxial groove 32 in which a sealing joint or ring 33 is firmly fitted and which, by elastic reaction, presses constantly against the inner surface 27 of the main body 2.

With the self-adjusting device 1 assembled according to the requirements of each specific application, the operation of the cutoff valve VC according to the invention is as follows:

In FIG. 1 the cutoff valve VC is open. In this situation the liquid fluid F can flow freely between the two semi-chambers, front 6 and rear 7, of the main body 2 via the longitudinal channels 31 of the cutoff element 19 and the longitudinal through holes 23 of the through element 18. The cutoff element 19 maintains its position relative to the through element 18 by means of the elastic reaction of its sealing joint or ring 33 which, as has been said, presses constantly against the inner surface 27 of the main body 2.

When the adjustment rod 3 is pulled by a force FU which is greater than the elastic reaction of the adjustment spring 4, said rod 3, together with the through element 18 of the cutoff valve VC of the invention which is joined to it, are made to slide towards the outside, the cutoff element 19 remaining in the position it occupied before the force FC was applied due to the action of its sealing joint 33. As the rod 3 and the through element 18 move, the adjustment spring 4 is further compressed and a certain volume of liquid fluid F flows through the longitudinal channels 31 of the cutoff element 19 and the through holes 23 of through element 18. The through element 18 continues to move until it meets the cutoff element 19, as shown in FIG. 2, at which point the sealing joint 29 of the cutoff element 19 blocks said holes 23 in the through element 18, preventing the liquid fluid F from passing through them. Thereafter, the incompressibility of the liquid fluid F inside the front semi-chamber 6 of the main body 2 causes the adjustment rod 3 to stop moving inside the main body 2 at the same time that the rod 3, the through element 18 and the cutoff element 19 become joined together.

When the force FU applied to the adjustment rod 3 stops acting, the elastic reaction of the adjustment spring 4 forces the rod 3 towards the rear end P of the main body 2, such that the cutoff element 18 joined to it separates from the cutoff element 19. When the through element 18 and cutoff element 19 separate, the sealing joint 29 of the cutoff element 19 no longer blocks the through holes 23 of the through element 18 such that the liquid fluid F can circulate freely through them. It is during the opening of the cutoff valve, i.e.

during the separation of the through element 18 and cutoff element 19, that the volumetric compensation dynamics of the liquid fluid F contained in both the front 6 and rear 7 semi-chambers, via the channels 31 of the cutoff element 19 and the through holes 23 of the through element 18, overcoming the elastic reaction of the sealing joint or ring 33 of the cutoff element 19, cause the cutoff element 19 to move towards the front end A of the main body 2. The amount of this displacement of the cutoff element 19 is a function of the variation in the length of the portion of the adjustment rod 3 contained within the main body 2 relative to the length of said portion of the rod 3 before it was pulled by the force FU applied to its front end 11.

In this way, the cutoff valve VC that forms the object of the invention is once again arranged to operate as explained above and, as described in the previous paragraph, the cutoff element 19 occupies a new position relative to the through element 18 according to the mechanical demands to which the adjustment rod 3 of the device 1 is subjected. Thus, apart from comprising a reduced number of components, giving it a high operational reliability as well as a reduced production cost, the valve VC which forms the object of the invention provides a solution to the limitations of some known types of cutoff valve due to the relatively reduced volume of liquid fluid F which flows through the valve during the cutoff operation when it is forced by the adjustment rod.

It will be understood that each of the elements described above, or two or more together, may also find a useful application in other types of constructions differing from the types described above.

While the invention has been illustrated and described as embodied in a cutoff valve for pistons of hydraulic self-adjusting devices, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A cutoff valve for a piston of a hydraulic self-adjusting device which includes a substantially cylindrical hollow body with a liquid fluid, an adjustment rod with an internal end provided with the piston and an external end protruding outside of the main body, an adjustment compression spring arranged inside the main body and having one end resting against an end of the main body from which the rod protrudes and another end resting against an internal end of the adjustment rod through a transverse support shoulder provided on the rod, the cutoff comprising an essentially cylindrical through element, an essentially cylindrical cutoff element, said through element being attachable to the internal end of the adjustment rod and having a plurality of longitudinal through holes through which the liquid fluid contained in the main body can flow, said cutoff element being slidable on the adjustment rod between said through element and the transverse support shoulder, said cutoff element having an end which faces said through element and is provided with a coaxial front groove; a cutoff joint arranged in said coaxial front groove and having such a size that when the valve is in a closed position it blocks said through holes of said through element thus preventing the liquid fluid from flowing, said cutoff element having a peripheral thickening with a plurality of longitudinal channels through which the liquid fluid contained within the main body can flow freely, said thickening having a coaxial groove provided with a sealing element which presses constantly against an inner surface of the main body.

2. A cutoff valve as defined in claim 1, wherein said sealing element in said coaxial groove of said thickening is formed as a sealing joint.

3. A cutoff valve as defined in claim 1, wherein said sealing element in said coaxial groove of said thickening is formed as a sealing ring.

4. A cutoff valve as defined in claim 1; and further comprising means for fixing said through element to the internal end of the adjustment rod and including peripheral knurling on the internal end, said through element being formed on said knurling by injection.

5. A cutoff valve as defined in claim 1, wherein said through element has a peripheral groove which is coaxial with the adjustment rod and having a size such that a sealing joint is fitted in said peripheral groove and by elastic reaction presses constantly against an inner surface of the main body so as to prevent the liquid fluid from passing via a close fit between the inner surface of the main body and said sealing joint.

6. A cutoff valve as defined in claim 1, wherein said cutoff element has a central through hole so that said cutoff element is arranged coaxially with said adjustment rod, said through hole having a size such that said cutoff element is slidable on the adjusting rod with a tight fit over a length determined by a distance between said through element and the transverse support shoulder of the rod.

7. A combination of a hydraulic self-adjusting device with a cutoff valve, comprising the hydraulic self-adjusting device including a substantially cylindrical and hollow main body for containing a liquid fluid, an adjustment rod having an internal end provided with a piston and an external end protruding from said main body, wherein said adjustment rod has a transverse support shoulder, an adjustment compression spring arranged inside said main body coaxially with said rod and having one end resting against an end of said main body from which said rod protrudes and another end resting against said internal end of said adjustment rod through said transverse support shoulder; and the cutoff valve including a cutoff valve for the piston of a hydraulic self-adjusting device which includes a substantially cylindrical hollow body with a liquid fluid, an adjustment rod with an internal end provided with the piston and an external end protruding outside of the main body, the adjustment compression spring arranged inside the main body and having one end resting against an end of the main body from which the rod protrudes and another end resting against an internal end of the adjustment rod through a transverse support shoulder provided on the rod, the cutoff comprising an essentially cylindrical through element, an essentially cylindrical cutoff element, said through element being attachable to the internal end of the adjustment rod and having a plurality of longitudinal through holes through which the liquid fluid contained in the main body can flow, said cutoff element being slidable on the adjustment rod between said through element and the transverse support shoulder, said cutoff element having an end which faces said through element and is provided with a coaxial front groove, a cutoff joint arranged in said coaxial front groove and having such a size that when the valve is in a closed position it blocks said through holes of said through element thus preventing the liquid fluid from flowing, said cutoff element having a peripheral thickening with a plurality of longitudinal channels through which the liquid fluid contained within the main body can flow freely, said thickening having a coaxial groove provided with a sealing element which presses constantly against an inner surface of the main body.

8. A combination as defined in claim 7, wherein said sealing element in said coaxial groove of said thickening is formed as a sealing joint.

9. A combination as defined in claim 7, wherein said sealing element in said coaxial groove of said thickening is formed as a sealing ring.

10. A combination as defined in claim 7; and further comprising means for fixing said through element to said internal end of said adjustment rod and including peripheral knurling on said internal end, said through element being formed on said knurling by injection.

11. A combination as defined in claim 7, wherein said through element has a peripheral groove which is coaxial with the adjustment rod and having a size such that a sealing joint is fitted in said peripheral groove and by elastic reaction presses constantly against an inner surface of said main body so as to prevent the liquid fluid from passing via a close fit between the inner surface of said main body and said sealing joint.

12. A combination as defined in claim 7, wherein said cutoff element has a central through hole so that said cutoff element is arranged coaxially with said adjustment rod, said through hole having a size such that said cutoff element is slidable on said adjusting rod with a tight fit over a length determined by a distance between said through element and said transverse support shoulder of said rod.

\* \* \* \* \*